(12) United States Patent
Syoji (10) Patent No.: US 9,105,897 B2
(45) Date of Patent: Aug. 11, 2015

(54) CYLINDRICAL AAA ALKALINE DRY BATTERY

(75) Inventor: Yasuhiko Syoji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 844 days.

(21) Appl. No.: 12/529,894

(22) PCT Filed: Mar. 16, 2009

(86) PCT No.: PCT/JP2009/001158
§ 371 (c)(1),
(2), (4) Date: Sep. 3, 2009

(87) PCT Pub. No.: WO2010/007711
PCT Pub. Date: Jan. 21, 2010

(65) Prior Publication Data
US 2011/0229756 A1    Sep. 22, 2011

(30) Foreign Application Priority Data

Jul. 18, 2008 (JP) .................................. 2008-186923

(51) Int. Cl.
*H01M 6/08* (2006.01)
*H01M 2/02* (2006.01)
*H01M 2/30* (2006.01)
*H01M 2/34* (2006.01)

(52) U.S. Cl.
CPC ............ *H01M 6/085* (2013.01); *H01M 2/0235* (2013.01); *H01M 2/0267* (2013.01); *H01M 2/30* (2013.01); *H01M 2/344* (2013.01)

(58) Field of Classification Search
None
See application file for complete search history.

(56) References Cited

U.S. PATENT DOCUMENTS

| 5,958,620 | A  | * | 9/1999 | Nagaura ....................... 429/164 |
| 6,197,445 | B1 | * | 3/2001 | Ward et al. .................... 429/163 |
| 6,391,490 | B1 |   | 5/2002 | Aoi et al. |

FOREIGN PATENT DOCUMENTS

| DE | 202008001713 U1 | 5/2008 | |
| JP | 09-147831 | 6/1997 | |
| JP | 09-161762 | 6/1997 | |
| JP | 11-031485 | * 2/1999 | .............. H01M 2/02 |
| JP | 2000-228174 | 8/2000 | |

(Continued)

OTHER PUBLICATIONS

Icode Electronics Technology (at http://www.chinaypages.com/sampleroom/onesample/303649639/Battery_Label.html (2008).*

(Continued)

*Primary Examiner* — Yoshitoshi Takeuchi
(74) *Attorney, Agent, or Firm* — McDermott Will & Emery LLP (57) ABSTRACT

The invention relates to a cylindrical AAA alkaline dry battery including: a positive terminal protruding from one end face of the alkaline dry battery; a negative terminal protruding from the other end face; and an external label covering the alkaline dry battery. The diameter Dp (mm) and protruding height Hp (mm) of the positive terminal and the diameter Dn (mm) and protruding height Hn (mm) of the negative terminal satisfy the relation (1): $2.5 \leq Dn-Dp \leq 4.1$ (1), and the relation (2): $0.8 \leq Hp-Hn \leq 1.1$ (2). This permits easy and reliable identification of the polarities of the terminals, making it possible to provide a cylindrical AAA alkaline dry battery which is unlikely to be installed reversely.

8 Claims, 3 Drawing Sheets

(56) References Cited

FOREIGN PATENT DOCUMENTS

| | | |
|---|---|---|
| JP | 2001-338638 | 12/2001 |
| JP | 2003-017028 A | 1/2003 |
| JP | 2006-190689 | 7/2006 |
| JP | 2008-004428 | 1/2008 |
| JP | 2008-130429 | 6/2008 |

OTHER PUBLICATIONS

English translation of Arai (JP 11-031485).*

Technical Handbook/Data Book of National/Panasonic alkaline dry battery and manganese dry battery (online), 2001, pp. 49-51, with Partial Translation, (http://www.madlabo.com/mad/god/research/batt/drycell_tdj_010531.pdf).

A Guidebook for Safety Design of Battery Compartment and Terminals of Battery Operated Devices, (second edition) pp. 7-11, edited and published by Battery Association of Japan, with Partial Translation.

A leaflet of Maxell Dynamic alkaline dry battery (online), 2005, with Partial Translation, (http://www.maxell.co.jp/jpn/dbps_data/_template_/_user_/_SITE_/localhost/_res/htdocs/industrial/battery/lineup/_res/pdf/LR03.pdf).

Chinese Office Action issued in Chinese Patent Application No. 200980000231X dated Nov. 1, 2011.

Partial English translation of IEC Standards of Primary Battery, F.L. Tye, "Battery", No. 2, pp. 26-37, 1983.

European Search Report issued in EP Patent Application No. 09713666.7 mailed Apr. 8, 2014.

* cited by examiner

CYLINDRICAL AAA ALKALINE DRY BATTERY

RELATED APPLICATIONS

This application is the U.S. National Phase under 35 U.S.C. §371 of International Application No. PCT/JP2009/001158, filed on Mar. 16, 2009, which in turn claims the benefit of Japanese Application No. 2008-186923, filed on Jul. 18, 2008, the disclosures of which Applications are incorporated by reference herein.

TECHNICAL FIELD

The invention relates to cylindrical alkaline dry batteries of size AAA according to ANSI standards (LR03 according to IEC standards or JIS standards).

BACKGROUND ART

Alkaline dry batteries have been widely used as the power source for daily necessities, toys, hobby goods, game machines, and electronic devices such as portable music players. At present, size D to N and prismatic (9V) alkaline dry batteries are manufactured and on sale. However, when batteries are installed in electronic devices, they may be installed incorrectly with the positive terminal and the negative terminal reversed (hereinafter referred to as simply "installed reversely").

As methods for preventing such reverse installation, attempts to improve battery structure have been made. For example, with respect to the end face of a cylindrical battery having a negative terminal, there has been proposed a structure in which the negative terminal is surrounded with a protrusion (Patent Document 1). Also, it has been proposed to provide insulating resin protrusions on the surface of a negative terminal (Patent Document 2). According to the methods described in Patent Documents 1 and 2, when a plurality of batteries are connected in series, it is possible to prevent the negative terminals of the batteries from being connected mistakenly.

It has also been proposed to improve device structure so that even if a battery is installed reversely, the terminals of the battery do not come into contact with the terminals of the device (Non-Patent Document 1).

Patent Document 1: Japanese Laid-Open Patent Publication No. Hei 9-147831
Patent Document 2: Japanese Laid-Open Patent Publication No. Hei 9-161762
Non-Patent Document 1: "A Guidebook for Safety Design of Battery Compartment and Terminals of Battery Operated Devices" (second edition)", P. 7-12, edited and published by Battery Association of Japan (incorporated body)

DISCLOSURE OF THE INVENTION

Problem To be Solved by the Invention

In the case of large alkaline dry batteries such as sizes D and C, both batteries and devices can be adapted to prevent reverse installation (Non-Patent Document 1). However, in the case of small alkaline dry batteries such as sizes AA, AAA, and N, it is difficult to employ the methods of Patent Documents 1 and 2, since the contact with a device terminal may become poor.

Among them, AAA alkaline dry batteries, in particular, are most likely to be installed reversely due to their size and shape. Since AAA alkaline dry batteries are the thinnest in shape, their polarity marks on the exterior are relatively small. Their terminal shape is also small. It is thus difficult to identify the polarities of the terminals by intuition.

Also, AAA alkaline dry batteries are widely used as the main power source for the remote controls for AV equipment, air conditioners, lighting equipment, etc. In each household, about 10 or more remote controls are used, and there is a high chance of replacing AAA alkaline dry batteries. It is therefore very important to prevent AAA alkaline dry batteries from being installed reversely.

In order to solve the above-described conventional problem, an object of the invention is to provide a cylindrical AAA alkaline dry battery that is unlikely to be installed reversely by improving the shape of the positive and negative terminals such that the polarities of the terminals can be identified in an easy and reliable manner.

Means for Solving the Problem

The invention is directed to a cylindrical AAA alkaline dry battery including: a positive terminal protruding from one end face of the alkaline dry battery; a negative terminal protruding from the other end face; and an external label covering the alkaline dry battery. It is characterized in that the diameter Dp (mm) and protruding height Hp (mm) of the positive terminal and the diameter Dn (mm) and protruding height Hn (mm) of the negative terminal satisfy the relation (1):

$$2.5 \leq Dn - Dp \leq 4.1 \quad (1),$$

and the relation (2):

$$0.8 \leq Hp - Hn \leq 1.1 \quad (2).$$

Preferably, the external label is colored with CMYK colors, and the tone value of the K color in the CMYK colors is higher by 30% or more at an end portion of the external label on the negative terminal side than at an end portion of the external label on the positive terminal side.

The end portion of the external label on the negative terminal side is preferably colored black.

The end portion of the external label on the positive terminal side is preferably colored gold, silver, or copper.

The external label preferably has gradation between the end portion on the positive terminal side and the end portion on the negative terminal side.

Effect of the Invention

According to the invention, since positive and negative terminals have significantly different shapes, the polarities of the terminals can be identified in an easy and reliable manner. It is therefore possible to provide a cylindrical AAA alkaline dry battery that is unlikely to be installed reversely.

BEST MODE FOR CARRYING OUT THE INVENTION

The invention relates to a cylindrical AAA alkaline dry battery including: a positive terminal protruding from one end face of the alkaline dry battery; a negative terminal protruding from the other end face; and an external label covering the alkaline dry battery. The invention is characterized in that the diameter Dp (mm) and protruding height Hp (mm) of the positive terminal and the diameter Dn (mm) and protruding height Hn (mm) of the negative terminal satisfy the relation (1):

$$2.5 \leq Dn-Dp \leq 4.1 \quad (1),\text{ and}$$

the relation (2):

$$0.8 \leq Hp-Hn \leq 1.1 \quad (2).$$

By setting (Dn−Dp) to 2.5 mm or more and (Hp−Hn) to 0.8 mm or more, the difference in the shape of the positive and negative terminals becomes evident. It is therefore possible to identify the polarities of the terminals in an easy and reliable manner, and suppress the occurrence of reverse installation of the AAA alkaline dry battery.

More specifically, the positive terminal comprises a substantially cylindrical protrusion formed on the bottom of the cylindrical battery case. The negative terminal comprises a substantially cylindrical protrusion formed on the seal plate covering the opening of the battery case.

As used herein, the protruding height Hp of the positive terminal refers to the length of the positive terminal protruding in the axial direction of the battery from the end face of the cylindrical battery on the positive electrode side (the end face of the battery case or external label, whichever is higher). The protruding height Hn of the negative terminal as used herein refers to the length of the negative terminal protruding in the axial direction of the battery from the end face of the cylindrical battery on the negative electrode side (the end face of the battery case or external label, whichever is higher and which is crimped around the negative terminal).

That is, it refers to the length of the portion protruding in the axial direction of the battery from the end face of the cylindrical battery when the battery is seen from the side.

As used herein, the diameter Dp of the positive terminal refers to the diameter of the cross-section of the side face portion of the positive terminal perpendicular to the axial direction of the battery (hereinafter referred to as simply "the diameter of the side face portion"). In the case of a positive terminal that is formed by the drawing process for producing a battery case, when the border between the end face portion and the side face portion is rounded, the end face portion (circular flat portion) of the positive terminal has a smaller diameter than the side face portion. In this case, the diameter of the side face portion of the positive terminal is used as the diameter Dp of the positive terminal.

As used herein, the diameter Dn of the negative terminal refers to the diameter of the cross-section of the side face portion of the negative terminal perpendicular to the axial direction of the battery (hereinafter referred to as simply "the diameter of the side face portion"). When the border between the end face portion and the side face portion of a negative terminal is rounded, the end face portion (circular flat portion) of the negative terminal has a smaller diameter than the side face portion. In this case, the diameter of the side face portion of the negative terminal is used as the diameter Dn of the negative terminal.

The diameter Dp and protruding height Hp of the positive terminal and the diameter Dn and protruding height Hn of the negative terminal can be measured using, for example, a projector equipped with a precision X-Y stage (e.g., profile projector V-12B available from Nikon Corporation).

The diameter and height of the body of the cylindrical battery in the invention can be those of the AAA battery defined in JIS standards.

Hereinafter, a description and a comparison are made of a battery 20 in FIG. 3 and a battery 30 in FIG. 4, which are different in the diameter and protruding height of the positive and negative terminals. The battery 20 in FIG. 3 has a positive terminal 21 and a negative terminal 22 which have a large difference in protruding height and diameter therebetween. The battery 30 in FIG. 4 has a positive terminal 31 and a negative terminal 32 which have a small difference in protruding height and diameter therebetween.

Figure 3:
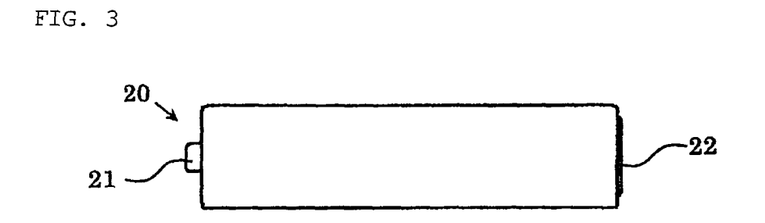
FIG. 3 is a schematic front view of a cylindrical AAA alkaline dry battery having a large difference in height between the positive and negative terminals and a large difference in diameter between the positive and negative terminals.
Figure 4:
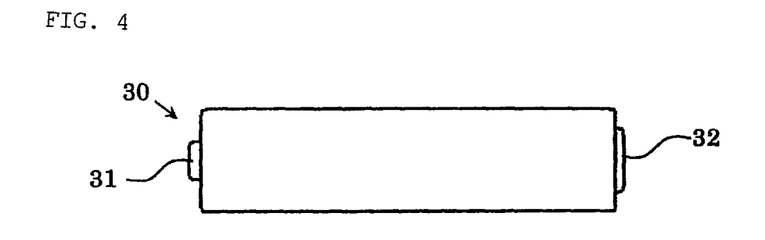
FIG. 4 is a schematic front view of a cylindrical AAA alkaline dry battery having a small difference in height between the positive and negative terminals and a small difference in diameter between the positive and negative terminals.

The battery 20 of FIG. 3 has a larger difference in the protruding height and diameter of the positive and negative terminals than the battery 30 of FIG. 4, exhibiting a significant difference in the shape of the two terminals. In this way, by providing a significant difference in diameter and protruding height between the positive terminal and the negative terminal, the positive terminal and the negative terminal can be readily identified visually.

In order to reduce the contact resistance with a device terminal and permit stable current flow, it is necessary to set the diameter Dp of the positive terminal to 2.4 mm or more. Also, the seal plate with the negative terminal needs to have a brim portion (crimped portion) around the negative terminal. In order to ensure sufficient sealing reliability by crimping, it is necessary to set the diameter Dn of the negative terminal to 6.5 mm or less. Therefore, (Dn−Dp) is 4.1 (=6.5−2.4) mm or less.

In terms of the ease of press forming, the diameter Dp of the positive terminal is preferably large. However, in terms of increasing the visibility of the positive terminal, the diameter Dp of the positive terminal is preferably 3.5 mm or less. In terms of ensuring stable contact with a device terminal and increasing the visibility of the negative terminal, the diameter Dn of the negative terminal is preferably 4.9 mm or more.

In terms of increasing the visibility of the positive terminal, the protruding height Hp of the positive terminal is preferably high. However, in order to secure sufficient internal volume of the battery case for housing power generating elements, it is necessary to set the protruding height Hp of the positive terminal to 1.2 mm or less. In order to reduce variation in the fitting of the external label to the battery case and ensure battery reliability, it is necessary to set the protruding height Hn of the negative terminal to 0.1 mm or more. Therefore, (Hp−Hn) is 1.1 (=1.2−0.1) mm or less.

In order to ensure prevention of poor contact with a device terminal and secure battery reliability, the protruding height Hp of the positive terminal is preferably 0.9 mm or more. In terms of increasing the visibility of the negative terminal, the protruding height Hn of the negative terminal is preferably 0.3 mm or less.

Figure 1:
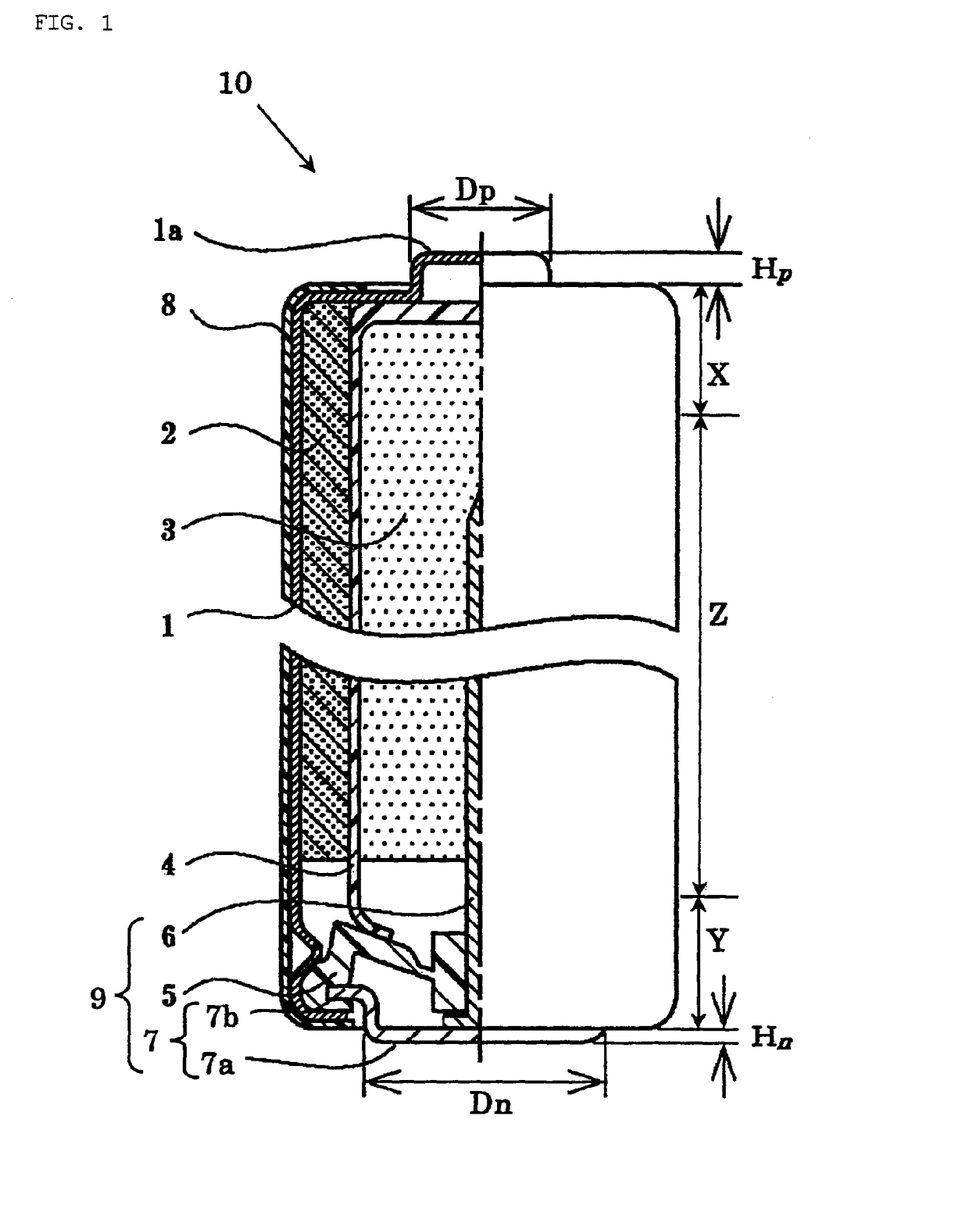
FIG. 1 is a partially sectional front view of a cylindrical AAA alkaline dry battery in one embodiment of the present invention.

Referring to FIG. 1, an embodiment of the cylindrical AAA alkaline dry battery of the invention is described. FIG. 1 is a partially sectional front view of a AAA alkaline dry battery 10 in an embodiment of the invention.

The cylindrical alkaline dry battery 10 (AAA-size) has a positive terminal 1a in the central part of the upper end face and a negative terminal 7a in the central part of the lower end face. The outer surface of the battery (the portion other than the two terminals) is covered with an external label 8. More specifically, the external label 8 of the battery covers the whole side face of the battery and the circumferential portions of the upper and lower end faces. The positive terminal 1a comprises a substantially cylindrical protrusion provided on the bottom of a cylindrical battery case 1 serving as the positive electrode current collector. The negative terminal 7a comprises a substantially cylindrical protrusion provided in the central part of a hat-like seal plate 7 covering the opening of the battery case 1.

A hollow cylindrical positive electrode 2 closely adheres to the inner face of the battery case 1. Inside the hollow of the positive electrode 2 is a negative electrode 3, with a cylindrical separator 4 having a bottom therebetween. The positive electrode 2 comprises, for example, a mixture of a positive electrode active material, a conductive agent such as graphite powder, and an alkaline electrolyte. The positive electrode active material comprises manganese dioxide, nickel oxyhydroxide, or a mixture thereof. The negative electrode 3 comprises, for example, a mixture of a negative electrode active material, a gelling agent such as sodium polyacrylate, and an alkaline electrolyte. The negative electrode active material comprises, for example, a zinc powder or zinc alloy powder. The separator is made of, for example, non-woven fabric composed mainly of polyvinyl alcohol fiber and rayon fiber. The alkaline electrolyte is an aqueous solution of potassium hydroxide.

The opening of the battery case 1 is fitted with a seal assembly 9 composed of a nail-like negative electrode current collector 6, the seal plate 7, and a resin gasket 5 which are integrated. The head of the negative electrode current collector 6 is electrically connected to the seal plate 7. The body of the negative electrode current collector 6 is inserted into the negative electrode 3. The gasket 5 is composed of a central cylindrical portion, an outer peripheral cylindrical portion, and a connecting portion connecting the central cylindrical portion with the outer peripheral cylindrical portion. The central cylindrical portion of the gasket 5 has a hole through which the negative electrode current collector 6 is inserted. The connecting portion of the gasket 5 has a thinned portion that functions as a safety valve when the battery internal pressure rises. The seal plate 7 has holes (not shown) through which the gas inside the battery is released to outside when the battery internal pressure rises. The open edge of the battery case 1 is crimped onto a circumferential portion (brim portion) 7b of the seal plate 7, with the outer peripheral cylindrical portion of the gasket 5 therebetween, to seal the battery.

According to the invention, in the above-described battery, the diameter Dp (mm) and protruding height Dn (mm) of the positive terminal 1a and the diameter Dn (mm) and protruding height Hn (mm) of the negative terminal 7a satisfy the following relations (1) and (2):

$$2.5 \leq Dn - Dp \leq 4.1 \quad (1)$$

$$0.8 \leq Hp - Hn \leq 1.1 \quad (2)$$

Hence, the difference in the shape of the positive and negative terminals becomes evident. It is therefore possible to identify the polarities of the terminals in an easy and reliable manner and suppress the occurrence of reverse installation.

The protruding height Hp of the positive terminal 1a is the length of the positive terminal 1a protruding in the axial direction of the battery from the upper end face of the external label 8 fitted to the circumferential portion of the end face (upper end face) of the battery on the positive electrode side.

The protruding height Hn of the negative terminal 7a is the length of the negative terminal 7a protruding in the axial direction of the battery from the lower end face of the external label 8 fitted to the circumferential portion (crimped portion) of the end face (lower end face) of the battery on the negative electrode side.

As used herein, the upper end face and lower end face of the external label 8 refer to the upper end face and lower end face of the external label 8 wrapped around the battery case in the area where both ends of the external label 8 along the axial direction of the battery do not overlap each other.

The diameter Dp of the positive terminal 1a is the diameter of the side face portion of the positive terminal 1a. Between the end face portion (circular flat portion) of the positive terminal 1a and the side face portion thereof, a rounded border is formed by the drawing process for producing the battery case 1, and the rounded border is arc-shaped in a cross-section of the positive terminal 1a along the axial direction of the battery. The diameter Dp of the positive terminal 1a is the diameter of the side face portion of the positive terminal 1a when the battery is seen from the positive-electrode end face side (upper end face side).

The diameter Dn of the negative terminal 7a is the diameter of the side face portion of the negative terminal 7a. Between the end face portion (circular flat portion) of the negative terminal 7a and the side face portion thereof, a rounded border is formed by the pressing process for producing the seal plate 7, and the rounded border is arc-shaped in a cross-section of the negative terminal 7a along the axial direction of the battery. The diameter Dn of the negative terminal 7a is the diameter of the side face portion of the negative terminal 7a when the battery is seen from the negative-electrode end face side (lower end face side).

The battery case 1 with the positive terminal 1a can be produced from, for example, a nickel-plated steel plate with a thickness of 0.2 to 0.5 mm, according to known methods (Drawing and Ironing) as described in Japanese Laid-Open Patent Publication No. Sho 60-180058 and Japanese Laid-Open Patent Publication No. Hei 11-144690.

The seal plate 7 with the negative terminal 7a can be produced, for example, by press forming a nickel-plated steel plate or tin-plated steel plate with a thickness of 0.2 to 0.5 mm into predetermined dimensions and shape. Also, between the end face portion and the side face portion of the negative terminal 7a, a border portion may be formed by a drawing process which has a curvature radius of 0.2 to 0.5 mm in a cross-section of the negative terminal 7a along the axial direction of the battery. By applying the drawing process to make the curvature radius small (to make the border portion sharp), the flatness of the end face portion can be emphasized. It is thus possible to identify the terminal polarity in a more reliable manner.

Figure 2:
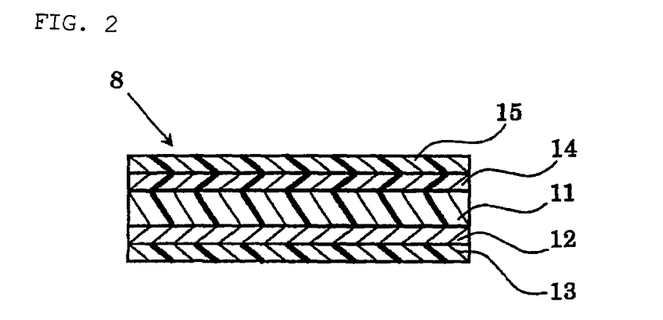
FIG. 2 is a schematic longitudinal sectional view of an example of an external label 8 in FIG. 1.

FIG. 2 is a schematic longitudinal sectional view of an example of the external label 8. As illustrated in FIG. 2, the external label 8 is composed of a substrate layer 11 comprising a heat-shrinkable resin film, a deposited metal layer 12 formed on one side of the substrate layer 11, an adhesive layer 13 covering the deposited metal layer 12, a printed layer 14 formed on the other side of the substrate layer 11, and a protective layer 15 covering the printed layer 14. However, the external label used in the alkaline dry battery of the invention is not to be construed as being limited to this.

The heat-shrinkable resin film is, for example, a film of polyethylene, polyvinyl chloride, polystyrene, or polyethylene terephthalate (e.g., 0.01 to 0.2 mm in thickness).

The adhesive layer 13 of the external label 8 is bonded to the outer surface of the battery case 1, so that the external label 8 is fixed to the battery case 1. The adhesive layer 13 is formed by applying an adhesive to the substrate layer 11. The adhesive is, for example, a heat sensitive adhesive.

The deposited metal layer 12 is formed, for example, by depositing a metal such as aluminum on the substrate layer 11 by a known method as described in Japanese Laid-Open Patent Publication No. Hei 9-237614. This allows the appearance of the external label 8 to have a metallic luster. When forming the deposited metal layer 12, it is preferable to further form an electrically insulating layer between the deposited metal layer 12 and the adhesive layer 13. As the material of the insulating layer, for example, a resin is used. When using a heat sensitive adhesive as the adhesive, it is preferable to use a resin having a higher softening point than the heat sensitive adhesive.

The printed layer 14 is formed by printing colors, design, characters, and the like on the substrate layer. The protective layer 15 is formed by applying varnish and transparent lacquer onto the printed layer 14. Examples of the materials used for the printed layer 14 are process ink composed of four colors (CMYK colors) of cyan, magenta, yellow, and black, and ultraviolet curable ink.

The printed layer 14 of the external label 8 is colored with CMYK colors, and the tone value of the K color ((K value) in the CMYK colors is preferably higher at the end portion of the external label 8 on the negative terminal 7a side than at the end portion of the external label 8 on the positive terminal 1a side by 30% or more, and more preferably 50% or more. By providing the external label fitted to the side face of the battery with color gradations along the axial direction of the battery, it is possible to direct attention to the difference in the polarities of the battery and suggest that the side with a stronger color tone is the negative side. This permits more reliable identification of the terminal polarities.

The end portion of the external label 8 on the negative terminal 7a side is preferably colored black. The end portion of the external label 8 on the positive terminal 1a side is preferably colored gold, silver, or copper. This can suggest that the metallic color side of gold, silver, or copper is the positive side and the black side is the negative side, thereby permitting more reliable identification of the terminal polarities.

As used herein, the end portion of the external label 8 on the positive terminal 1a side refers to the portion of the external label 8 positioned at the circumferential portion of the upper end face of the battery 10 and the area of the side face of the battery 10 with a predetermined width (width X in FIG. 1) from the end on the positive terminal 1a side. The end portion of the external label 8 on the negative terminal 7a side as used herein refers to the portion of the external label 8 positioned at the circumferential portion of the lower end face of the battery 10 and the area of the side face of the battery 10 with a predetermined width (width Y in FIG. 1) from the end on the negative terminal 7a side. In terms of visibility, X and Y in FIG. 1 are preferably about 5 mm or more, and more preferably about 10 mm or more.

It is preferable to provide the area of the external label 8 (the area with a width Z in FIG. 1) between the end portion on the positive terminal 1a side and the end portion on the negative terminal 7a side with gradations along the axial direction of the battery 10. This can suggest the flow of electricity to the user and direct his or her attention to the difference in the polarities of the battery, thereby permitting more reliable identification of the terminal polarities. This can also give the product an upscale image.

EXAMPLES

Examples of the invention are hereinafter described in detail, but the invention is not to be construed as being limited to these Examples.

Example 1

A AAA alkaline dry battery as illustrated in FIG. 1 above was produced.

A plurality of positive electrode pellets 2 were inserted into a cylindrical battery case 1 with a bottom comprising a nickel-plated steel plate with a graphite coating film formed on the inner face thereof. They were then pressed inside the battery case 1, so that they closely adhered to the inner face of the battery case 1. The battery case 1 used was produced by drawing and ironing a nickel-plated steel plate of 0.4 mm in thickness into a can having a predetermined shape and dimensions. The positive electrode 2 used was composed of a mixture of a manganese dioxide powder, a graphite powder, and an alkaline electrolyte (weight ratio 92.5:6.0:1.5). A separator 4 was disposed inside the positive electrode 2. A non-woven fabric composed mainly of polyvinyl alcohol fiber and rayon fiber was used as the separator 4. Thereafter, an alkaline electrolyte was injected into the battery case 1. A potassium hydroxide aqueous solution with a concentration of 35% by weight was injected as the alkaline electrolyte.

A negative electrode 3 was charged into the separator 4. The negative electrode 3 used was composed of a mixture of a zinc powder, sodium polyacrylate, and an alkaline electrolyte (weight ratio 66:1:33).

The body of a negative electrode current collector 6 was inserted through the through-hole in the central part of a gasket 5. The head of the negative electrode current collector 6 was welded to a seal plate 7, to form a seal assembly 9. The seal plate 7 used was produced by press forming a nickel-plated steel plate (thickness 0.3 mm) to a predetermined shape and dimensions. The opening of the battery case 1 was sealed with the seal assembly 9. At this time, the negative electrode current collector 6 was inserted into the negative electrode 3, and the open edge of the battery case 1 was crimped onto a circumferential portion 7b of the seal plate 7 with the edge of the gasket 5 therebetween. Subsequently, the outer surface of the battery case 1 was coated with an external label 8 (thickness approximately 80 µm).

The external label 8 used was a laminate sheet composed of: a substrate layer (thickness 50 µm) comprising a polyethylene terephthalate film; a deposited aluminum layer (thickness approximately 0.05 µm) formed on one side of the substrate layer; and an adhesive layer foamed on the deposited aluminum layer (adhesive composed mainly of a copolymer of butyl acrylate and acrylic acid, thickness approximately 25 µm). The other side of the external label 8 was white and blank without printing. In this way, an alkaline dry battery was produced.

In the above battery production, the diameter Dp of the positive terminal 1a was set to 3.40 mm, and the protruding height Hp was set to 1.10 mm. The diameter Dn of the negative terminal 7a was set to 5.90 mm, and the protruding height Hn was set to 0.30 mm. That is, (Dn−Dp)=2.50 mm, and (Hp−Hn)=0.80 mm.

Example 2

The diameter Dp of the positive terminal 1a was set to 3.40 mm, and the protruding height Hp was set to 1.20 mm. The diameter Dn of the negative terminal 7a was set to 5.90 mm, and the protruding height Hn was set to 0.15 mm. That is, (Dn−Dp)=2.50 mm, and (Hp−Hn)=1.05 mm.

Except for the above, a battery was produced in the same manner as in Example 1.

Example 3

The diameter Dp of the positive terminal 1a was set to 3.30 mm, and the protruding height Hp was set to 1.10 mm. The diameter Dn of the negative terminal 7a was set to 6.35 mm, and the protruding height Hn was set to 0.30 mm. That is, (Dn−Dp)=3.05 mm, and (Hp−Hn)=0.80 mm.

Except for the above, a battery was produced in the same manner as in Example 1.

Example 4

The diameter Dp of the positive terminal 1a was set to 3.40 mm, and the protruding height Hp was set to 1.15 mm. The diameter Dn of the negative terminal 7a was set to 6.20 mm, and the protruding height Hn was set to 0.20 mm. That is, (Dn−Dp)=2.80 mm, and (Hp−Hn)=0.95 mm.

Except for the above, a battery was produced in the same manner as in Example 1.

Comparative Example 1

The diameter Dp of the positive terminal 1a was set to 3.70 mm, and the protruding height Hp was set to 1.20 mm. The diameter Dn of the negative terminal 7a was set to 5.90 mm, and the protruding height Hn was set to 0.50 mm. That is, (Dn−Dp)=2.20 mm, and (Hp−Hn)=0.70 mm.

Except for the above, a battery was produced in the same manner as in Example 1.

Comparative Examples 2 to 5

Four-brand commercial products of AAA alkaline dry batteries (A to D), 10 of each brand, were obtained. The outer diameter Dp and height Hp of their positive terminals and the outer diameter Dn and height Hn of their negative terminals were measured with a projector, to calculate the (Dn−Dp) and (Hp−Hn) values of these commercial products. The (Dn−Dp) and (Hp−Hn) values were obtained as the average value of the ten batteries.

Figure 5:
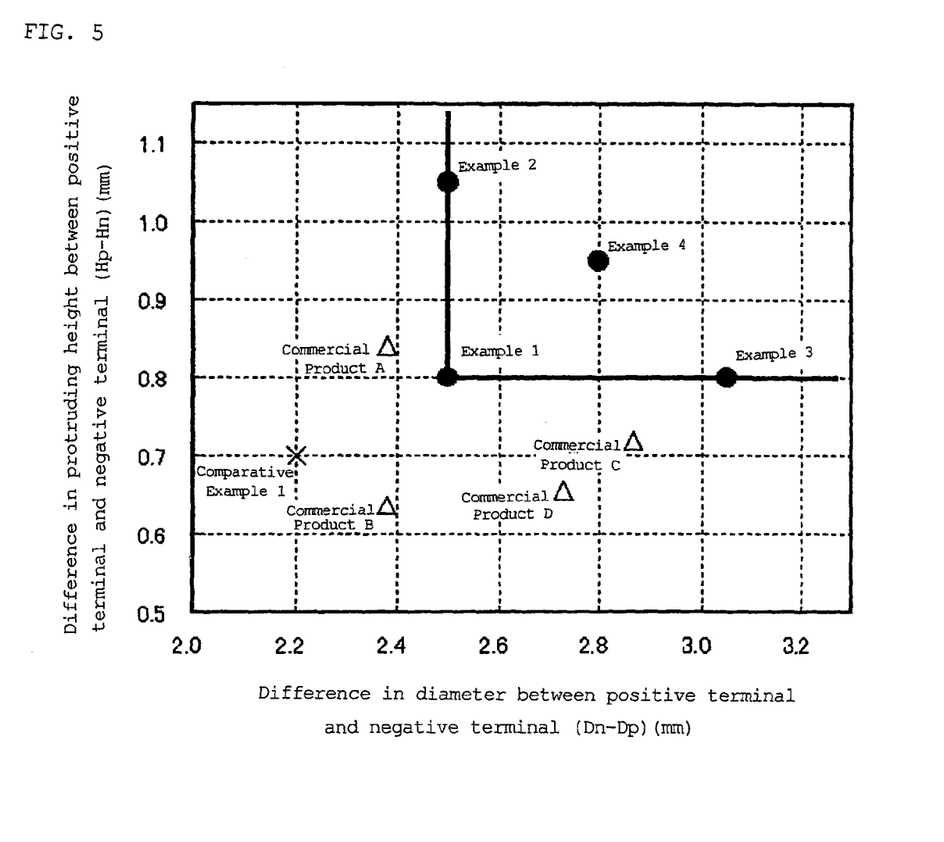
FIG. 5 is a plot of (Dn−Dp) and (Hp−Hn) for the batteries of Examples 1 to 4 of the invention and the battery of Comparative Example 1.

FIG. 5 is a plot of (Dn−Dp) and (Hp−Hn) values for Examples 1 to 4 and Comparative Examples 1 to 5. FIG. 5 shows that the batteries of Examples 1 to 4 satisfy the condition: (Dn−Dp)=2.5 to 4.1 and (Hp−Hn)=0.8 to 1.1, whereas Comparative Example 1 does not satisfy this condition. It also shows that the commercial products A to D of Comparative Examples 2 to 5 do not satisfy the condition, either.

[Evaluation 1]

Using the AAA alkaline dry batteries of Examples 1 to 4 and Comparative Example 1, the following evaluation (battery installation test) was conducted. A remote control for an air conditioner using two AAA alkaline dry batteries and an electronic dictionary using two AAA alkaline dry batteries were used as devices into which batteries were to be installed. A monitoring test was conducted in which 97 people aged from 9 to 71 were asked to install the batteries of Examples 1 to 4 and Comparative Example 1 into the above-mentioned devices. The ratio of the number of times of reverse installation to the number of times of installation into the devices (hereinafter "reverse installation rate") was obtained. Specifically, the reverse installation rate was determined according to the following formula.

Reverse installation rate (%)=(the number of people who installed the batteries reversely into the remote control+the number of people who installed the batteries reversely into the electronic dictionary)/(97×2)×100

As a result, the batteries of Comparative Example 1 had a reverse installation rate of 3.6%, whereas the batteries of Examples 1 to 4 had a reverse installation rate of 0%. Next, the evaluation of terminal visibility by the color of the external label is described.

Example 5

An external label which was the same as that of Example 1 was used. A black ink was applied onto the substrate layer of the external label at the portion to be positioned at the circumferential portion of the end face of the battery on the negative electrode side and the area of the side face of the battery with a width of 10 mm from the end on the negative terminal side (the area with a width Y of 10 mm in FIG. 1). TK Hy-Unity Neo Soy available from TOYO INK MFG. CO., LTD. was used as the black ink. The CMYK values of this ink were: C value=0%; M value=0%; Y value=0%; and K value=100%. In this way, a printed layer (thickness approximately 2 μm) was formed on the substrate layer.

Varnish was applied onto the printed layer to form a protective layer (thickness approximately 2 μm).

Except for the above, a battery was produced in the same manner as in Example 4.

Example 6

An external label which was the same as that of Example 1 was used. A blue ink was applied onto the substrate layer of the external label at the portion to be positioned at the circumferential portion of the end face of the battery on the negative electrode side and the area of the side face of the battery with a width of 10 mm from the end on the negative terminal side (the area with a width Y of 10 mm in FIG. 1). A gold ink was applied onto the other portions of the external label than the portion to which the blue ink was applied.

The blue ink used was a mixture of black, yellow, and cyan inks. TK Hy-Unity Neo Soy available from TOYO INK MFG. CO., LTD. was used as the black, yellow, and cyan inks. The CMYK values of the blue ink were: C value=100%; M value=80%; Y value=0%; and K value=30%.

The gold ink used was prepared by mixing a yellow ink with a transparent medium. TK Hy-Unity Neo Soy available from TOYO INK MFG. CO., LTD. was used as the yellow ink. The CMYK values of the gold ink were: C value=86%; M value=0%; Y value=0%; and K value=0%. That is, in the external label, the difference in the tone value of K between the end portion on the positive terminal side and the end portion on the negative terminal side was made 30%. In this way, a printed layer (thickness approximately 2 μm) was formed on the substrate layer.

Varnish was applied onto the printed layer to form a protective layer (thickness approximately 2 μm).

Except for the above, a battery was produced in the same manner as in Example 4.

[Evaluation 2]

The batteries of Examples 4 to 6 were evaluated as follows.

A monitoring test was conducted on 267 people aged from 7 to 84, using four devices: a remote control for an air conditioner; an electronic dictionary; a portable game machine; and a penlight, which used two AAA alkaline dry batteries. The reverse installation rate was obtained according to the following formula.

Reverse installation rate (%)=(the number of people who installed the batteries reversely into the remote control+the number of people who installed the batteries reversely into the electronic dictionary+the number of people who installed the batteries reversely into the game machine+the number of people who installed the batteries reversely into the penlight)/(267×4)×100

The batteries of Example 5 had a reverse installation rate of 0.19%, which was approximately ¼ of the rate (0.84%) of the batteries of Example 4. The batteries of Example 6 had a reverse installation rate of 0.28%, which was ⅓ of the reverse installation rate (0.84%) of the batteries of Example 4. That is, it has been confirmed that the batteries of Examples 5 and 6 with the colored external labels permit more reliable identification of the terminal polarities than the batteries of Example 4 with the non-colored external label, thereby enabling more effective prevention of reverse installation.

INDUSTRIAL APPLICABILITY

The cylindrical AAA alkaline dry battery of the invention with improved visibility of the terminal polarities is unlikely to cause reverse installation. Therefore, it is advantageously used for various battery operated devices.

What is claimed is:

1. A cylindrical AAA alkaline dry battery comprising: a positive terminal protruding from one end face of the alkaline dry battery; a negative terminal protruding from the other end face; and an external label covering the alkaline dry battery, wherein the diameter Dp (mm) and protruding height Hp (mm) of the positive terminal and the diameter Dn (mm) and protruding height Hn (mm) of the negative terminal satisfy the relation (1):

$$2.5 \leq Dn-Dp \leq 4.1 \quad (1),$$

and the relation (2):

$$0.8 \leq Hp-Hn \leq 1.1 \quad (2);$$

and the diameter Dp of the positive terminal is 2.4 mm or more and 3.5 mm or less, the diameter Dn of the negative terminal is 4.9 mm or more and 6.5 mm or less, the protruding height Hp of the positive terminal is 0.9 mm or more and 1.2 mm or less, and the protruding height Hn of the negative terminal is 0.1 mm or more and 0.3 mm or less.

2. The cylindrical AAA alkaline dry battery in accordance with claim 1, wherein the external label is colored with CMYK colors, and the tone value of the K color in the CMYK colors is higher by 30% or more at an end portion of the external label on the negative terminal side than at an end portion of the external label on the positive terminal side.

3. The cylindrical AAA alkaline dry battery in accordance with claim 2, wherein the end portion of the external label on the negative terminal side is colored black.

4. The cylindrical AAA alkaline dry battery in accordance with claim 2, wherein the end portion of the external label on the positive terminal side is colored gold, silver, or copper.

5. The cylindrical AAA alkaline dry battery in accordance with claim 2, wherein the external label has gradation between the end portion on the positive terminal side and the end portion on the negative terminal side.

6. The cylindrical AAA alkaline dry battery in accordance with claim 3, wherein the external label has gradation between the end portion on the positive terminal side and the end portion on the negative terminal side.

7. The cylindrical AAA alkaline dry battery in accordance with claim 4, wherein the external label has gradation between the end portion on the positive terminal side and the end portion on the negative terminal side.

8. The cylindrical AAA alkaline dry battery in accordance with claim 1, wherein a border portion having a curvature radius of 0.2 to 0.5 mm in a cross-section of the negative terminal along an axial direction of the battery is formed between an end face portion and a side face portion of the negative terminal.

* * * * *